(12) United States Patent
Faltyn et al.

(10) Patent No.: US 9,473,533 B2
(45) Date of Patent: Oct. 18, 2016

(54) SECURE MOBILE FRAMEWORK (71) Applicant: SNCR, LLC, Bridgewater, NJ (US)

(72) Inventors: Daniel Faltyn, New York, NY (US); Andrew J. R. Smith, Purchase, NY (US)

(73) Assignee: SNCR, LLC, Bridgewater, NJ (US)

( * ) Notice: Subject to any disclaimer, the term of this patent is extended or adjusted under 35 U.S.C. 154(b) by 0 days.

(21) Appl. No.: 14/267,399

(22) Filed: May 1, 2014

(65) Prior Publication Data

US 2014/0245378 A1 Aug. 28, 2014

Related U.S. Application Data

(62) Division of application No. 13/854,837, filed on Apr. 1, 2013.

(60) Provisional application No. 61/618,511, filed on Mar. 30, 2012, provisional application No. 61/806,763, filed on Mar. 29, 2013.

(51) Int. Cl.
*G06F 17/30* (2006.01)
*G06F 21/00* (2013.01)
(Continued)

(52) U.S. Cl.
CPC .............. *H04L 63/20* (2013.01); *H04L 63/08* (2013.01); *H04W 12/06* (2013.01); *H04W 12/08* (2013.01)

(58) Field of Classification Search
CPC ..... H04L 63/10; H04L 63/20; H04L 63/102; H04L 67/10; H04L 67/34; G06F 17/30; G06F 21/00; G06F 21/30; G06F 21/41; G06F 21/60; G06F 21/604; G06F 21/629
USPC .............. 709/203, 225, 229; 726/1, 2, 3, 27
See application file for complete search history.

(56) References Cited

U.S. PATENT DOCUMENTS 5,857,201 A   1/1999   Wright, Jr. et al.
5,961,590 A   10/1999  Mendez et al.
(Continued)

OTHER PUBLICATIONS

Good Technology, "Enterprise Mobility Management," http://www1.good.com/mobility-management-solutions/mobile-device-management, 3 pages, 2013.
(Continued)

*Primary Examiner* — Joseph P Hirl
*Assistant Examiner* — Kalish Bell
(74) *Attorney, Agent, or Firm* — SNCR, LLC; Frederick W. Dour (57) ABSTRACT

Systems and methods for a secure mobile framework to securely connect applications running on mobile devices to services within an enterprise are provided. Various embodiments provide mechanisms of securitizing data and communication between mobile devices and end point services accessed from a gateway of responsible authorization, authentication, anomaly detection, fraud detection, and policy management. Some embodiments provide for the integration of server and client side security mechanisms, binding of a user/application/device to an endpoint service along with multiple encryption mechanisms. For example, the secure mobile framework provides a secure container on the mobile device, secure files, a virtual file system partition, a multiple level authentication approach (e.g., to access a secure container on the mobile device and to access enterprise services), and a server side fraud detection system.

12 Claims, 10 Drawing Sheets

(51) Int. Cl.
*G06F 21/30* (2013.01)
*G06F 21/41* (2013.01)
*H04L 29/06* (2006.01)
*H04W 12/08* (2009.01)
*H04W 12/06* (2009.01)

(56) References Cited

U.S. PATENT DOCUMENTS

| | | | |
|---|---|---|---|
| 5,968,131 | A | 10/1999 | Mendez et al. |
| 6,023,708 | A | 2/2000 | Mendez et al. |
| 6,085,192 | A | 7/2000 | Mendez et al. |
| 6,131,096 | A | 10/2000 | Ng et al. |
| 6,131,116 | A | 10/2000 | Riggins et al. |
| 6,151,606 | A | 11/2000 | Mendez |
| 6,233,341 | B1 | 5/2001 | Riggins |
| 6,298,073 | B1 | 10/2001 | LeFever |
| 6,324,542 | B1 | 11/2001 | Wright, Jr. et al. |
| 6,708,221 | B1 | 3/2004 | Mendez et al. |
| 6,766,454 | B1 | 7/2004 | Riggins |
| 7,039,679 | B2 | 5/2006 | Mendez et al. |
| 7,225,231 | B2 | 5/2007 | Mendez et al. |
| 7,228,383 | B2 | 6/2007 | Friedman et al. |
| 7,284,045 | B1 | 10/2007 | Marl et al. |
| 7,287,271 | B1 | 10/2007 | Riggins |
| 7,363,349 | B2 | 4/2008 | Friedman et al. |
| 7,373,517 | B1 | 5/2008 | Riggins |
| 7,702,322 | B1 | 4/2010 | Maurya et al. |
| 7,970,386 | B2 | 6/2011 | Bhat et al. |
| 8,012,219 | B2 | 9/2011 | Mendez et al. |
| 2003/0074206 | A1 | 4/2003 | Hoffman et al. |
| 2003/0093681 | A1* | 5/2003 | Wettstein ............ H04L 63/0407 713/185 |
| 2005/0120219 | A1 | 6/2005 | Munetoh et al. |
| 2006/0212574 | A1 | 9/2006 | Maes |
| 2006/0274695 | A1 | 12/2006 | Krishnamurthi et al. |
| 2007/0101418 | A1 | 5/2007 | Wood et al. |
| 2008/0066165 | A1 | 3/2008 | Rosenoer |
| 2008/0244724 | A1 | 10/2008 | Choe et al. |
| 2009/0300739 | A1* | 12/2009 | Nice et al. ........................ 726/6 |
| 2010/0050251 | A1 | 2/2010 | Speyer et al. |
| 2010/0162362 | A1 | 6/2010 | Battle et al. |
| 2010/0299719 | A1* | 11/2010 | Burks et al. ...................... 726/3 |
| 2010/0306547 | A1 | 12/2010 | Fallows et al. |
| 2011/0126002 | A1 | 5/2011 | Fu et al. |
| 2011/0252240 | A1 | 10/2011 | Freedman et al. |
| 2011/0307947 | A1 | 12/2011 | Kariv et al. |
| 2012/0042005 | A1 | 2/2012 | Papakostas et al. |
| 2012/0131685 | A1 | 5/2012 | Broch et al. |
| 2013/0042115 | A1 | 2/2013 | Sweet et al. |
| 2013/0061302 | A1* | 3/2013 | Colla et al. ........................ 726/6 |
| 2013/0086630 | A1 | 4/2013 | Kavantzas et al. |
| 2013/0091557 | A1* | 4/2013 | Gurrapu ............................ 726/5 |

OTHER PUBLICATIONS

International Application No. PCT/US2013/034853, International Search Report & Written Opinion, 6 pages, Jul. 16, 2013.

PCT Application No. PCT/US2013/034853, International Preliminary Report on Patentability, dated Oct. 9, 2014, 5 pages.

* cited by examiner

SECURE MOBILE FRAMEWORK

CROSS-REFERENCE TO RELATED APPLICATIONS

This application is a divisional of U.S. patent application Ser. No. 13/854,837 filed Apr. 1, 2014, which claims priority to U.S. Provisional Application Ser. No. 61/618,511 filed Mar. 30, 2012 and U.S. Provisional Application Ser. No. 61/806,763 filed Mar. 29, 2013. The entire contents of the above applications are incorporated herein by reference for all purposes.

TECHNICAL FIELD

Various embodiments of the present invention generally relate to mobile devices. More specifically, some embodiments of the present invention relate to a secure mobile framework for securely connecting applications running on mobile devices to services within an enterprise.

BACKGROUND

Many companies or enterprises are either providing mobile devices (e.g., smartphones, tablets, etc.) to employees or allowing employees to bring their own mobile device. However, allowing employees to access services within the company through a mobile device has increased the company's exposure to potential security breaches. For example, if an employee lost their mobile device, an unauthorized party could retrieve any unsecured data on the phone and potentially access services within the company. As another example, if the employee leaves the company and does not give back the mobile device, the former employee could still potentially access sensitive data stored on the device or within the company.

In order to mitigate this type of unauthorized access, many companies use mobile device management (MDM) policies to restrict control of the mobile devices and thereby reduce potential security risks for mobile devices that are capable of connecting to services within the enterprise. The MDM policies that are set by the enterprise control and protect data through management of the configuration settings of the mobile devices. In order to manage the configuration settings, over-the-air programming (OTA) capabilities are often used. The use of OTA capabilities allows the enterprise to remotely configure a single mobile device or an entire fleet of mobile devices, to send software and OS updates, and to remotely lock and wipe a device in order to protect the data stored on the device when it is lost or stolen, etc.

However, the restrictions imposed by the MDM polices can be cumbersome to the user who may also be using the device in a personal capacity. For example, an MDM policy may require the mobile device to auto lock and prompt the user to provide a password with a particular set of characteristics before the mobile device is unlocked. The user may find these restrictions annoying. As such, there are a number of challenges and inefficiencies created in traditional mobile device management.

SUMMARY

Systems and methods are described for a secure mobile framework capable of securely connecting applications running on mobile devices to services (e.g., an e-mail service, a trading service, or a reservation service) within an enterprise. In some embodiments, an authentication request from a remote device to access a service provided by an enterprise can be received at a gateway associated with the enterprise. The request can originate from an enterprise managed application running on the remote device. A framework authentication token and security policy (e.g., password structure, password duration, access controls for an application and/or secure container of data, etc.) can be generated.

The security policy can be based on the service provided by the enterprise that the remote device is requesting to access. The framework authentication token and the security policy can then be transmitted to the remote device which ensures compliance with the security policy before generating a connection request to connect to the service within the enterprise. The connection request can be based on the framework authentication token and the security policy. A service authenticator determines if the application running on the remote device is authorized to access the service. Some embodiments monitor interactions between the enterprise managed application and the service. Upon detecting a violation of one or more fraud policies at the mobile device and/or gateway, an elevated authentication request can be generated.

In some embodiments, a request can be received from an initiating device to establish a service connection between an enterprise managed application running on the initiating device and an enterprise service. The request includes authentication credentials associated with an end-user. A framework authentication token can be generated and transmitted to the initiating device, wherein upon receipt the initiating device initiates a service connection request based on the authentication token. A secure connection can be created between the enterprise service and the initiating device upon successful validation (e.g., authorization and authentication) of the service connection request. Any data transmitted to the initiating device using the stored connection can be stored within a secure container that is only accessible by the enterprise managed application.

Embodiments of the present invention also include computer-readable storage media containing sets of instructions to cause one or more processors to perform the methods, variations of the methods, and other operations described herein.

In various embodiments, a system can include a gateway, an authenticator, a token generator, a communications module, a discovery service, and/or a fraud detection module. The gateway can be configured to provide remote devices access to services of an enterprise. In some embodiments, the gateway can include multiple levels, each of which provides isolated authentication protocols and activity logging. The remote devices can have stored thereon one or more applications managed by the enterprise. The authenticator can be configured to determine if a user is authorized to access the enterprise and to construct policies regarding the management of the one or more applications.

The token generator can be configured to generate one or more tokens (e.g., authentication token, a user binding token, and/or a framework authentication token) for creating secure connections between one or more applications managed by the enterprise and servers. The tokens can be based on various identifiers such as, but not limited to the following: user identifier, device identifiers, device type identifiers, application family identifiers, etc. Some tokens may include a binding of other tokens. For example, in one embodiment, a framework authentication token can be based on an enterprise authentication token, a user binding token, and/or a framework authentication token expiration date. In some embodiments, one or more of the tokens may be cryptographically secured (e.g., digitally signed) that allow for the system to detect if the tokens have been tampered with or altered.

The communications module can be configured to communicate the policies to the remote devices. The discovery service can be configured to determine which of the services of the enterprise to connect with the one or more applications. The anomaly detector can be configured to monitor activity between the remote devices and the servers and generate an indicator of anomalies in activity. For example, the anomaly detector may monitor the IP velocity of the user, failed log-in attempts, etc.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention relate generally to a secure mobile framework capable of securely connecting applications running on mobile devices to services within an enterprise. Some examples of services provided by an enterprise include, but are not limited to, an e-mail service, a trading service, a payment processing service, a customer relationship management service, an inventory system service, a business intelligence service, a healthcare service, a student information service, a reservation service, secure services, and/or other services containing sensitive information. In accordance with some embodiments, the secure mobile framework provides a collection of software libraries and service components which provide software developers the ability to build secure applications on non-enterprise mobile devices. The secure mobile framework can be used in conjunction by enterprises that have firewalled content, services, and network from the public network through means of a DMZ type architecture. As a result, much of the enterprise's existing authentication and authorization systems can be utilized. Client and server libraries can be utilized or extended to provide secure storage and communication in both the client and server applications.

There are a number of enterprises which through internal policy or regulation need to ensure that enterprise content and communication is protected, managed and monitored. Normally for devices managed by the enterprise, the aforementioned control requirements are directly implemented through device and operating system (OS) management. However, for devices which are not managed by the enterprise and cannot connect directly to the enterprise network, there is a need to ensure that the same controls are applied to enterprise applications running on these unmanaged devices.

In accordance with various embodiments, the secure mobile framework can provide one or more of the following features to connect and utilize services within the enterprise: 1) mechanisms to store enterprise content on device in a protected manner whereby the enterprise content can only be accessed by authorized users, possibly offline, and be managed through enterprise policy; 2) mechanisms to provide multiple authentications against the gateway (i.e., framework authentication) and against the enterprise services (i.e., enterprise authentication), provide secure connection to those enterprise services where authorized, and manage per service access through enterprise policy; 3) mechanism to manage and support connected applications and their dependent services; and 4) mechanisms to dynamically detect an undesirable or unsafe operating system environment and manage through a multi-step process (e.g., evaluating the policy, interrogation of the program, interrogation of the OS, and/or performing other checks in the client and/or server environments).

The gateway can generate one or more tokens which can be used for authentication. For example, in some embodiments, an enterprise authentication token (EAT) can be generated representing a single or multi-factor credentials that can be used to authenticate with a given company as if single or multi factor credentials were presented, for a finite period of time. A user binding token (UBT) can also be used in one or more embodiments. The UBT can be an amalgamated, unique representation of a user (id), device (id), type of device, and app family. In addition, a framework authentication token (FAT) can be used in various embodiments. The FAT can be created by binding an EAT, UBT, and an expiration date used to authenticate with the framework. One advantage of this construction of the FAT is that the details cannot be tampered with by an unauthorized party.

In some embodiments, secure mobile framework client and server components can be used to detect the integrity of the operational environment for the client application. Given the client application is executing within an unmanaged operating system environment it may need to ascertain, as best it can, if the environment is considered to be unsafe.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

While, for convenience, embodiments of the present invention are described with reference to dedicated enterprise-based setups, embodiments of the present invention are equally applicable to various other operational models such as cloud-based models. Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices (e.g., mobile devices, server machines, etc.) may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present invention, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" refers broadly to a software, hardware, firmware, or service (or any combination thereof) component. Modules are typically functional components that can generate useful data or other output using specified input(s). A module may or may not be self-contained. An application program (also called an "application") may include one or more modules, or a module can include one or more application programs.

GENERAL DESCRIPTION

Figure 1:
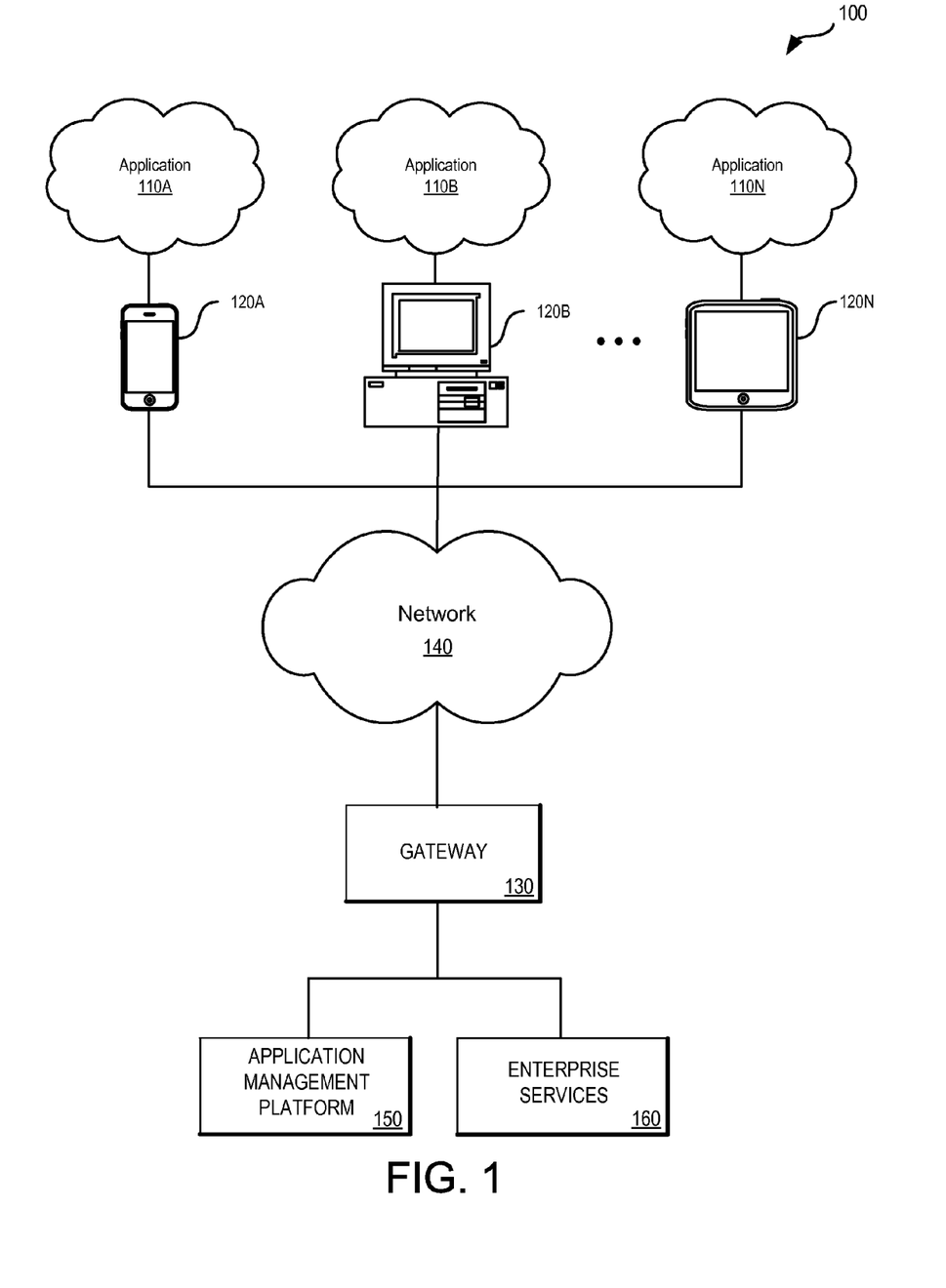
FIG. 1 illustrates an example of a network-based environment in which some embodiments of the present invention may be utilized.

FIG. 1 illustrates an example of a network-based environment 100 in which some embodiments of the present invention may be utilized. As illustrated in FIG. 1, various enterprise managed applications 110A-110N can be running on user devices 120A-120N. In accordance with various embodiments of the present invention, user devices 120A-120N may or may not be managed by the enterprise. User devices 120A-120N can include enterprise managed applications 110A-110N that can be used to access services and data within the enterprise. User devices 120A-120N may use network 140 to submit and retrieve information from services within the enterprise. User devices 120A-120N can interact with various enterprise services through an application programming interface (API) that runs on the native operating system of the device, such as IOS® or ANDROID™.

Gateway 130 manages the access of enterprise managed applications 110A-110N and user devices 120A-120N. Gateway 130 can be used to verify and establish a trust relationship between the enterprise managed applications 110A-110N and business specific services provided by the enterprise. For example, in some embodiments, the data and requests initially submitted by enterprise managed applications 110A-110N are transferred between the device and gateway 130 via network 140. Once gateway 130 is satisfied with the security of the device, then gateway 130 can open up a channel to some business specific service within the application management platform 150 and enterprise services 160. Gateway 130 and services within the application management platform 150 can have multiple independent layers of security and checks.

User devices 120A-120N can be any computing device capable of receiving user input as well as transmitting and/or receiving data via the network 140. In one embodiment, user devices 120A-120N can be any device having computer functionality, such as a personal digital assistant (PDA), mobile telephone, smartphone, tablet, wearable types of mobile computers, body-mounted computers, or similar device. User devices 120A-120N can be configured to communicate via network 140, which may comprise any combination of local area and/or wide area networks, using wired and/or wireless communication systems. In one embodiment, network 140 uses standard communications technologies and/or protocols. Thus, network 140 may include links using technologies such as Ethernet, 802.11, worldwide interoperability for microwave access (Wi-MAX), 3G, 4G, CDMA, digital subscriber line (DSL), etc.

Similarly, the networking protocols used within the various layers of network 140 may include multiprotocol label switching (MPLS), transmission control protocol/Internet protocol (TCP/IP), User Datagram Protocol (UDP), hypertext transport protocol (HTTP), hypertext transport protocol secure (HTTPs), simple mail transfer protocol (SMTP), file transfer protocol (FTP), secure file transfer protocol (SFTP), and/or other networking protocols. Data exchanged over network 140 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Figure 2:
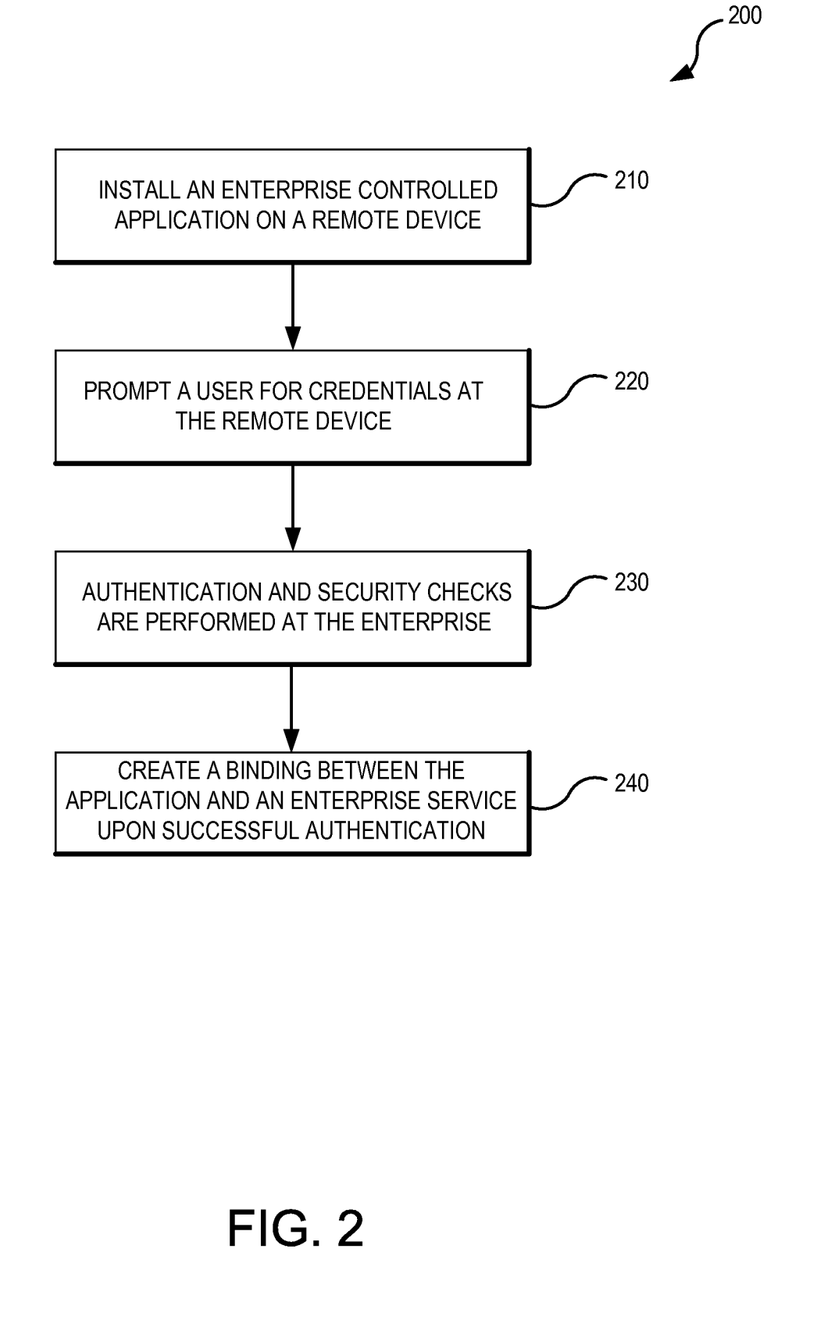
FIG. 2 is a flowchart with a set of exemplary operations for creating a binding between an enterprise managed application and an enterprise service in accordance with one or more embodiments of the present invention.

FIG. 2 is a flowchart with a set of exemplary operations 200 for creating a binding between an enterprise managed application and an enterprise service in accordance with one or more embodiments of the present invention. As illustrated in FIG. 2, installation operation 210 installs an enterprise controlled application on a remote device. The application may be installed by an end-user of the device, an individual from the enterprise, or other source. For example, in some embodiments, the application may be remotely installed or downloaded from an application store. Once the application is installed, authentication operation 220 can prompt a user of the remote device to provide a set of credentials which can be authenticated against the framework. A variety of security protocols and standards (e.g., passwords, passcodes, time-based tokens, encrypted data, auto-lock, etc.) may be used as part of the remote device and application security and authentication processes.

A variety of authentication and security checks are performed at the enterprise during authentication operation 230. In some embodiments, for example, once the set of credentials are received from the user, an authorization request can be sent from the remote device (i.e., the client) to the gateway server. The gateway server can determine a current policy which should be applied at the remote device and send policy information from the gateway server to the remote device. Then, the device characteristics can be checked and new container credentials can be acquired if necessary. If the gateway determines that the application should have access to one or more servers within the enterprise, creation operation 240 can be used to create a binding between the application and an enterprise service.

Figure 3:
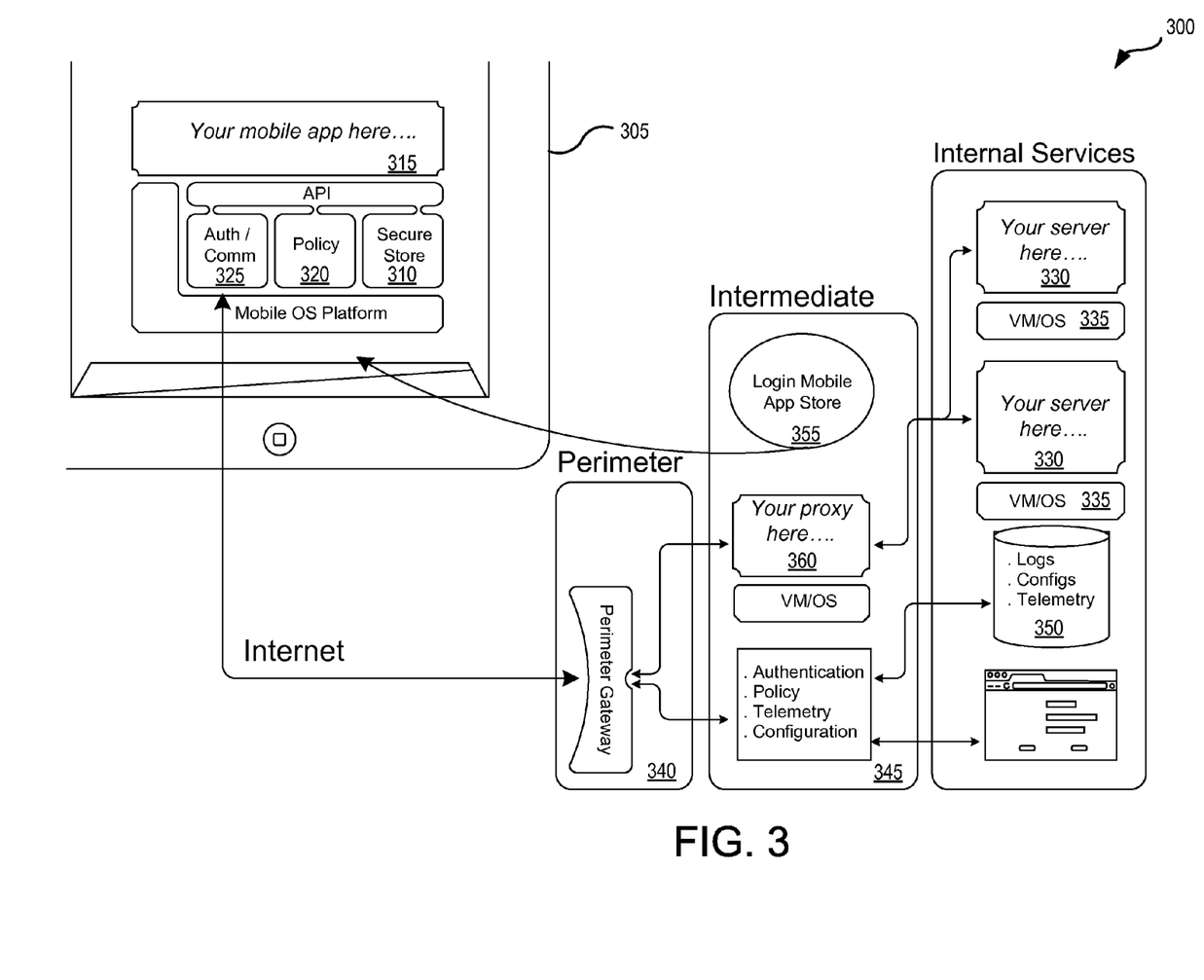
FIG. 3 illustrates a general architecture for a secure framework which can be used in accordance with various embodiments of the present invention.

FIG. 3 illustrates a general architecture 300 for a secure mobile framework in accordance with various embodiments of the present invention. The secure mobile framework components can be used to manage and protect enterprise content stored on mobile device 305. In some embodiments, mobile device 305 can include a secure storage 310, policy 320, and/or authentication store 325 for mobile application 315. Mobile application 315 can have a virtual file system that sits under the application. In some embodiments, mobile application 315 can use or generate one or more ephemeral keys, which can have multiple constituent components. The ephemeral keys can be assigned to each partition of the virtual file system to encrypt every file with its own key.

Secure storage 310 can securely store enterprise data locally on mobile device 305. Secure storage 310 can include a group of protected files managed as single unit through policy 320. In some embodiments, enterprise content can be stored in encrypted files and accessed via random access methods. In addition, various mechanisms can be used to set encryption block sizes on a per file basis and simultaneously maintain a sidecar index file used to aid with the synchronization content between client and service. The protected files are held within a secure partition which uses a single encrypted master file to hold per file encryption keys and a translation between applications file names and obfuscate file names. This secure file partition mechanism can be used to securitize not only application content directly but also used as a virtual file system for database servers hosted on the device, logging and telemetry data for customer support.

Policy 320 can be an application specific (or application family) security policy set by the enterprise with which application 315 should comply. An application family generally refers to a grouping of applications governed by a common policy that share access to authorization and authentication information on a given device, for a given user. Policy 310 can include the value of security variables used in authorization, authentication, and securitizing data on the device. For example, policy 320 can include password structure, how long the device can remain disconnected from the gateway, how many times the user can fail to enter in a correct password, and other security variables.

A further instance of a secure file partition is authentication store 325 which can contain authentication credentials (e.g., tokens and assertions), policy details, and a master encryption key used to encrypt all other secure file partitions master files. An authentication store master file store can be encrypted with an ephemeral key generated based on a user password or phrase. Furthermore, authentication store 325 can be shared among multiple applications on the device to form a common store for enterprise access and sharing encrypted content.

Once application 315 and corresponding components are installed on mobile device 305, application 315 can request access to one or more internal services within an enterprise running on servers 330 or virtual machines 335 after passing one or more device security checks. The request from application 315 is first received at a perimeter gateway 340 where a first round of authentication is established before allowing application access to an intermediate layer 345. Intermediate layer 345 authenticates the user and ensures that the policy being enforced by application 315 is up-to-date. In addition, mobile device telemetry and configuration settings can be gathered, processed, analyzed, evaluated, and/or recorded within database 350. This information can be useful in creating (e.g., in real-time or in near real-time) various indicators of fraud or anomaly detection. Intermediate layer 345 also allows application 315 to log into mobile application store 350. In addition, proxy 355 can be used as an intermediary between application 315 and the servers 330.

Figure 4:
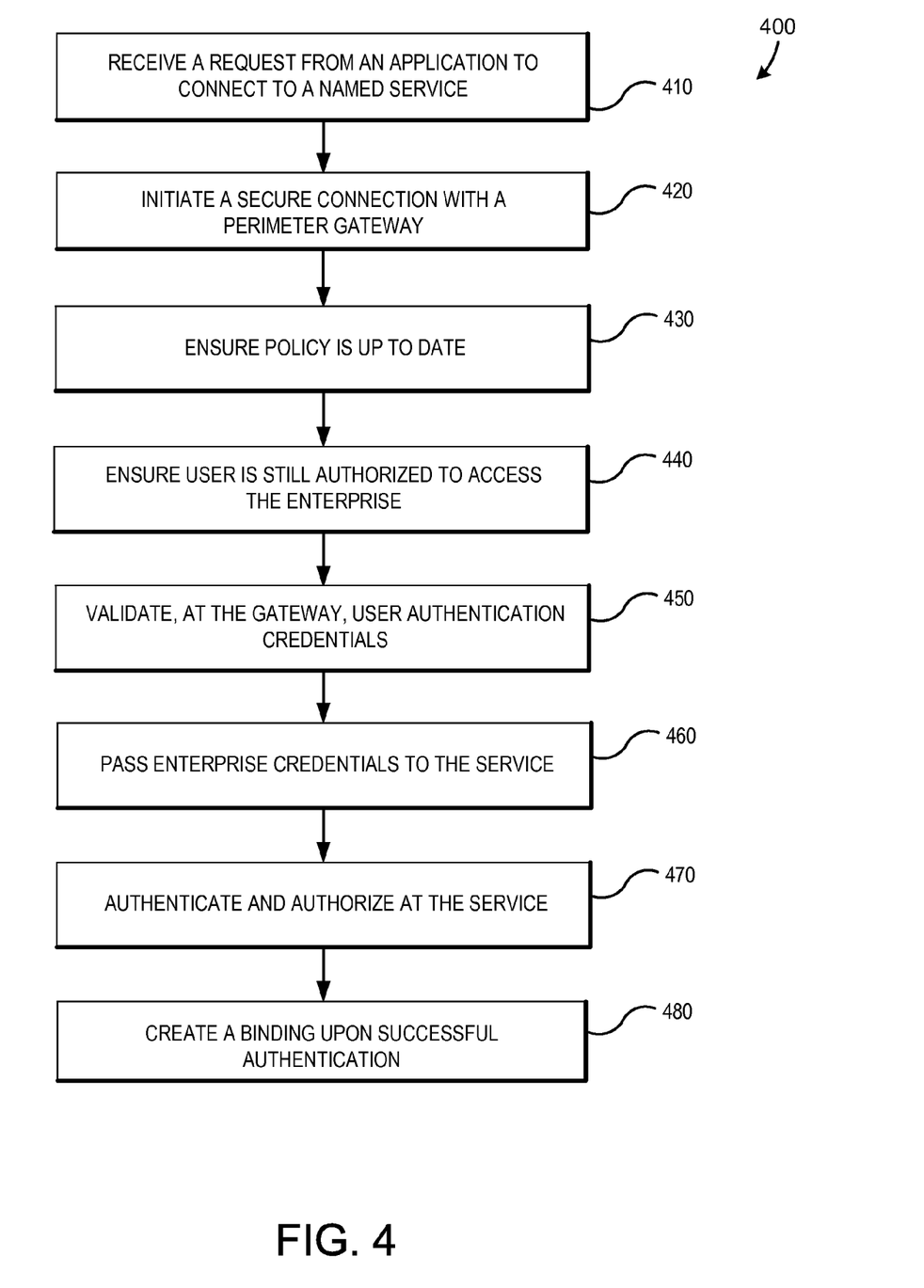
FIG. 4 is a flowchart illustrating a set of exemplary operations for authorizing an enterprise managed application in accordance with some embodiments of the present invention.

FIG. 4 is a flowchart illustrating a set of exemplary operations 400 for authorizing an enterprise managed application in accordance with some embodiments of the present invention. During receiving operation 410, a request from an enterprise managed application can be received. The request can identify a named service within the enterprise to which the application would like to connect. Initiation operation 420 initiates a secure connection with a perimeter gateway. The perimeter gateway can then ensure the policy operating on the device is up to date using policy verification operation 430 and that the user is still authorized to access enterprise services during user verification operation 440.

If the policy and user are successfully validated, then validation operation 450 validates the user's authentication credentials at the gateway. Enterprise credentials are then passed to the destination service during submission operation 460 where authentication and authorization take place during verification operation 470. Upon successful authentication, binding operation 480 creates a binding between the application and the named service.

Figure 5:
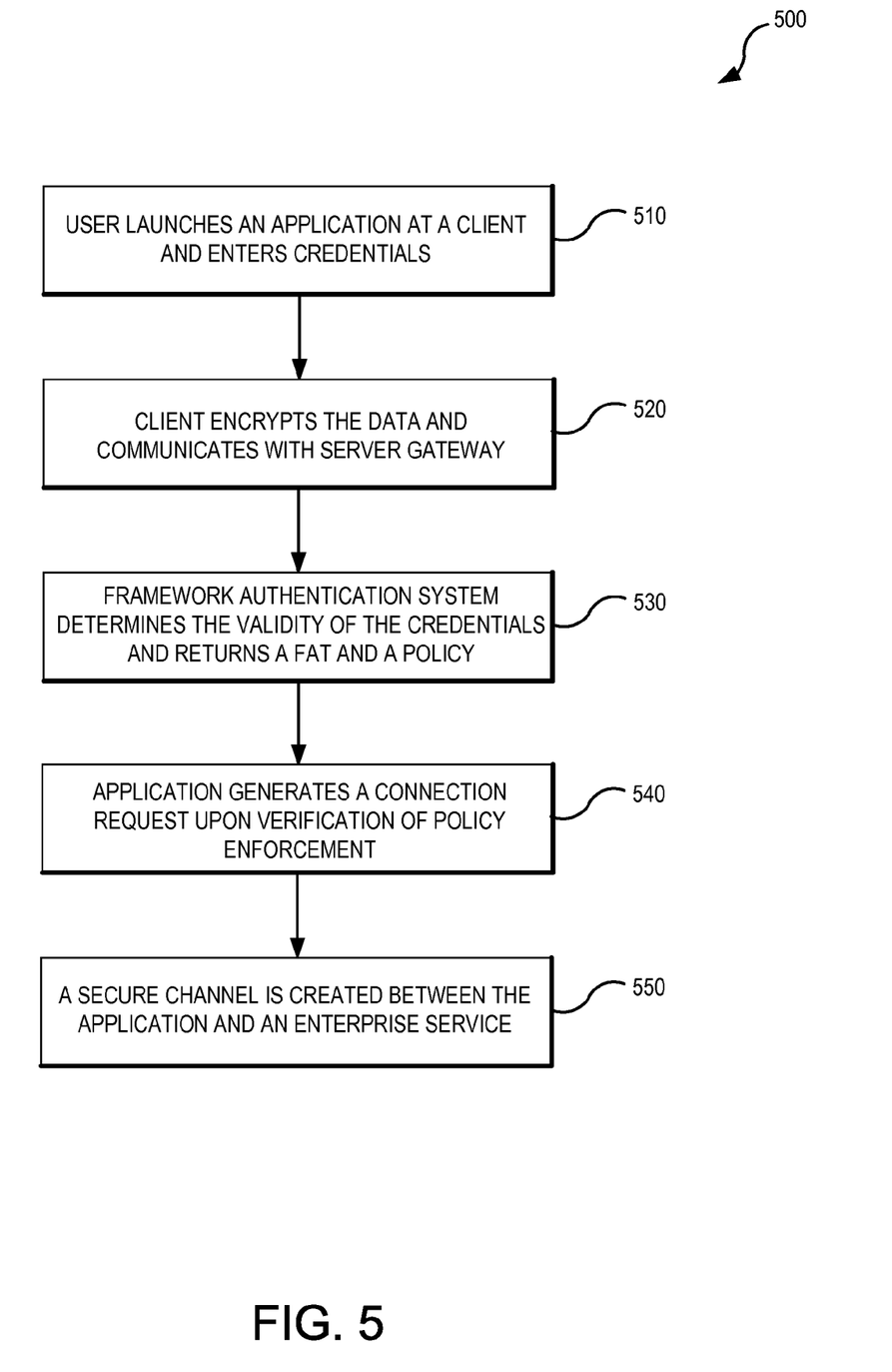
FIG. 5 is a flowchart illustrating a set of exemplary operations for creating a secure channel between an enterprise service and an enterprise managed application running on a remote device in accordance with one or more embodiments of the present invention.

FIG. 5 is a flowchart illustrating a set of exemplary operations 500 for creating a secure channel between an enterprise service and an enterprise managed application running on a remote device in accordance with one or more embodiments of the present invention. As illustrated in FIG. 5, the user causes an enterprise managed application running on a client device to launch during launch operation 510. The application prompts the user for a set of container credentials. Once the credentials are received from the user, the client device uses encryption operation 520 to encrypt the data and communication with a server gateway of the enterprise.

The enterprise managed application can use a framework authentication token (FAT) to authenticate with the gateway, and an enterprise authentication token (EAT) to authenticate with a service. Validation operation 530 determines (e.g., using a framework authentication system) the validity of the FAT. A server authorizer can then construct one or more tokens for creating a secure connection to the enterprise service. For example, in some embodiments the server authorizer can create a User Binding Token (UBT) consisting of the user id, the application id, and the device id. In addition, the FAT can be created by binding the UBT, EAT, and an expiration date. In addition, the server authorizer may determine if the user is authorized to access the enterprise. A secure mobile framework server can construct a policy based on the enterprise services the user can interact with. The information in the policy can include the FAT expiration date, a type of enterprise authentication the user must perform when the FAT expires, and other policy information used to secure data on the mobile device. The secure mobile framework server gateway can then respond to the mobile device with the FAT and the policy.

The calling client (e.g., the mobile device) can use an authentication store to save the FAT and policy content. The application can then use generation operation 540 to generate a connection request upon verification of the policy enforcement. Then creation operation 550 creates a secure channel between the enterprise managed application and the enterprise service. For example, the application can ask the client secure mobile framework to connect to a particular enterprise service using some canonical name. Then, the framework can send the service name along with the UBT to the secure mobile framework server service authenticator over the same connection. The service authenticator determines if the UBT is allowed to connect to that destination.

The secure mobile framework server service router can then map the canonical name to the real address of the service, and establish a connection. The mobile application can now communicate freely over a secured channel once the enterprise authentication is successfully completed. On subsequent requests for connections, the application may ask the secure mobile framework to connect to a particular service using some canonical name. The secure mobile framework can then send the service name along with the UBT and EAT to the secure mobile framework gateway. In some embodiments, the next time the application attempts to connect with the service, this information can be used rather than the user entered enterprise credentials, at least until the FAT expires.

Figure 6:
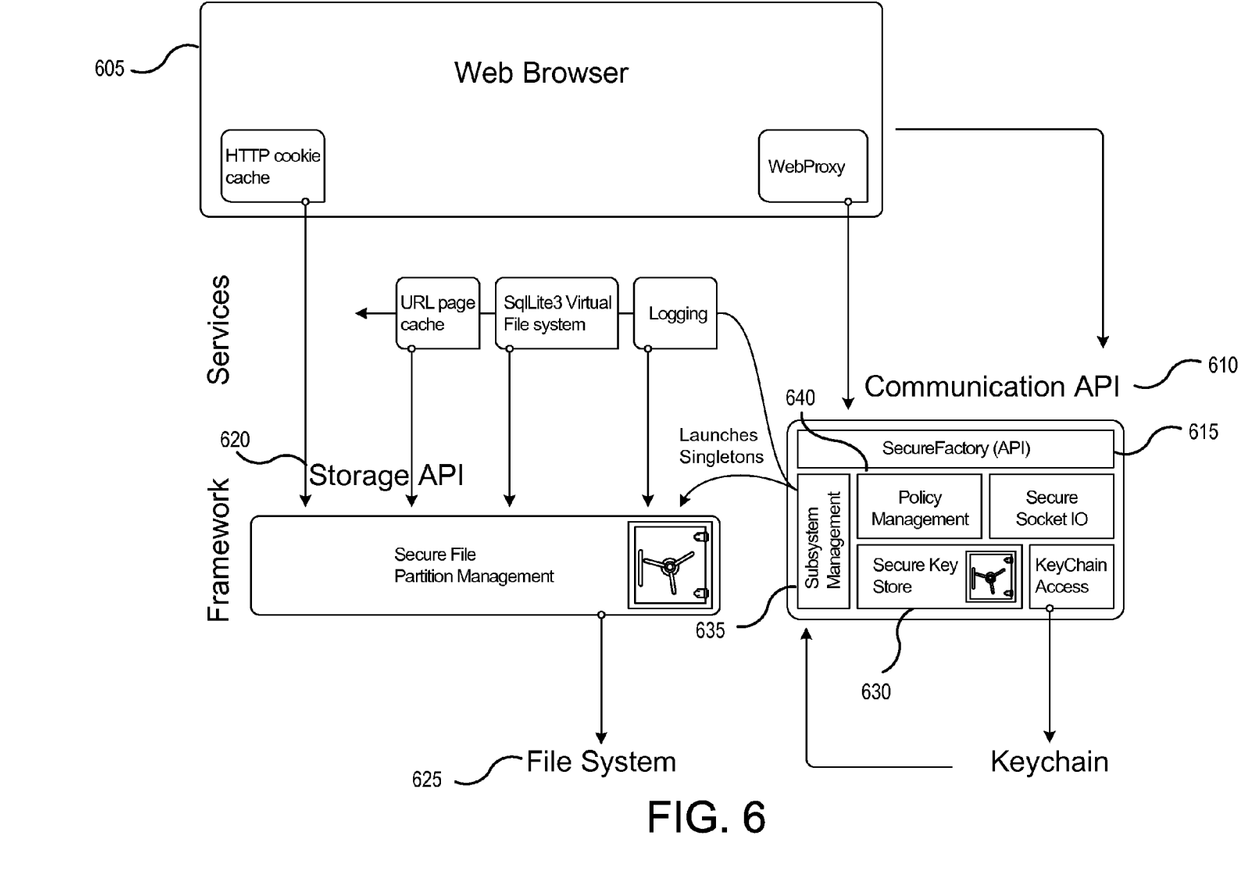
FIG. 6 is an example of an application built on a secure mobile framework which can be used with various embodiments of the present invention.

FIG. 6 is an example of an application built on a secure mobile framework which can be used with various embodiments of the present invention. As illustrated in FIG. 6, web browser 605 represents an implementation of a web browser capable of generating standard HTTP/S requests which may be wrapped in a custom protocol. Web browser 605 can use communications API 610 to establish a connection to the gateway. In some embodiments, communications API 610 can be built on top of secure socket layer (SSL) to access secure factory API 615 for authenticating the user. Typical web based applications require storage of data such as cookies shared with the server and historical URLs. The web browser implementation illustrated in FIG. 6 uses storage API 620 and a secure file partition manager to encrypt data before utilizing the operating system underlying file system 625

Communications API 610 obtains the user's raw credentials or stored token (FAT) to establish a connection with an enterprise gateway using secure key store 630. For example, upon receiving the user's credentials, a secure key can be retrieved from secure key store 630. This key can be used to access a key chain after which subcomponents of the framework can be initialized. System management 635 can receive, from the device/application, an identification of a current policy associated with the application. Using policy management 640 a determination can be made as to whether the policy associated with the application is up to date or needs to be updated. System management 635 can ensure that proper logging, virtual file system management, and page caching occur.

Upon successful authorization and authentication, the gateway requests policy and device information from communications API 610. Upon successful validation, the gateway can bind a connection to a web browser proxy service, capable of making HTTP/S calls within the enterprise. Web browser 605 can then transmit the wrapped HTTP/S requests through this channel.

Figure 7:
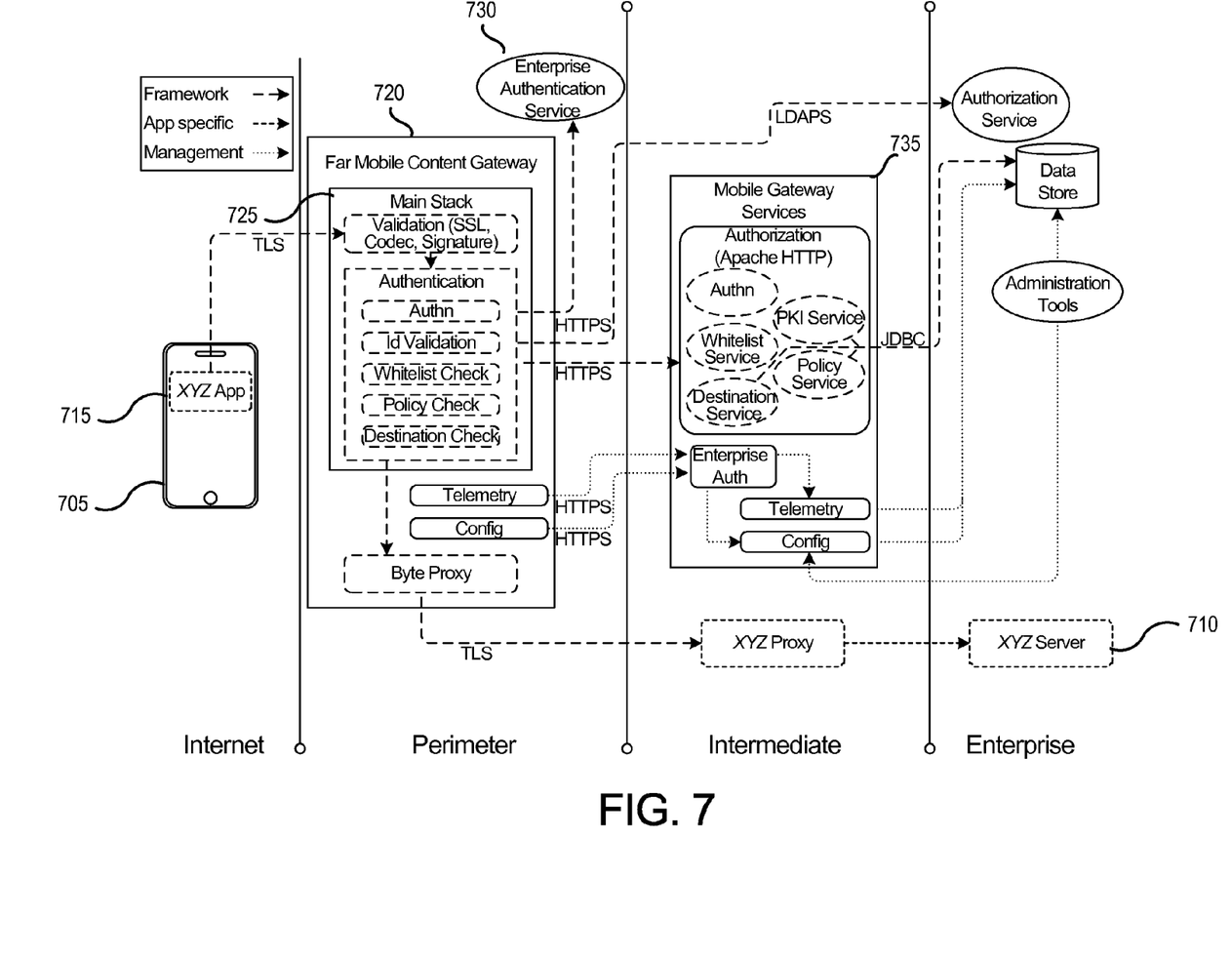
FIG. 7 illustrates a remote device accessing a service within an enterprise in accordance with some embodiments of the present invention.

FIG. 7 illustrates a remote device 705 accessing a server 710 within an enterprise in accordance with some embodiments of the present invention. As illustrated in FIG. 7, various embodiments of the present invention allow remote device 705 to access the enterprise through a multi-level authentication process. For example, in order to connect to an endpoint service running on server 710 within an enterprise, a container authentication, a framework authentication, and an enterprise authentication should all be successfully completed in some embodiments. Many traditional authentication systems would require that in order to use an application on a mobile device, a user typically enters a password to unlock the device and then supply a user name and password to authenticate against a remote service. In contrast, various embodiments of the present invention use multiple layers of security before allowing access to data on a device or connections to the remote services.

Upon launching application 715, a request is sent to far mobile content gateway 720. Within the main stack 725 of far mobile content gateway 720, validation and authentication of the user and device can be confirmed. For example, in some embodiments, an enterprise authentication system 730 (e.g., RSA® or Kerberos™) can be used. In some embodiments, the authentication process can include a username, a whitelist check, a policy check, and/or a destination check. In addition, device telemetry and configurations can be monitored and transmitted to a second intermediate authentication layer. These allow for the user, device, and application to be authenticated.

Once the user, device, and application have been authenticated, a connection can be established with server 710. Many embodiments use the various tokens created during the authentication of the user, device, and application for establishing a connection with server 710. Far mobile content gateway 720 can connect with mobile gateway services 735 for additional authentication services for access to servers within the enterprise. For example, in some embodiments, a user can enter a password or other authentication credentials within application 715 that can be used to decrypt data stored locally on the device. Then, the user could present a FAT to a gateway process running on a remote environment. The gateway process uses the FAT to authorize and authenticate the user and the device. Then, to access any particular service, the user would present an EAT to the remote service. In some embodiments, the FAT and EAT can be stored locally on the device after preforming one or more pluggable forms of authentication (e.g., time codes+ pin, biometrics, passwords, etc.).

In some embodiments, the form of authentication can be rotated on a predefined schedule (e.g., periodic) or upon detection of one or more events. For example, the gateway can securely transmit the current authentication form to the mobile device which can be stored in the secure store. While FIG. 7 illustrates examples, such as HTTPS and TLS, of secure connections which can be used, other embodiments of the present invention can use different protocols for creating connections for messaging and transferring data between system components.

Figure 8:
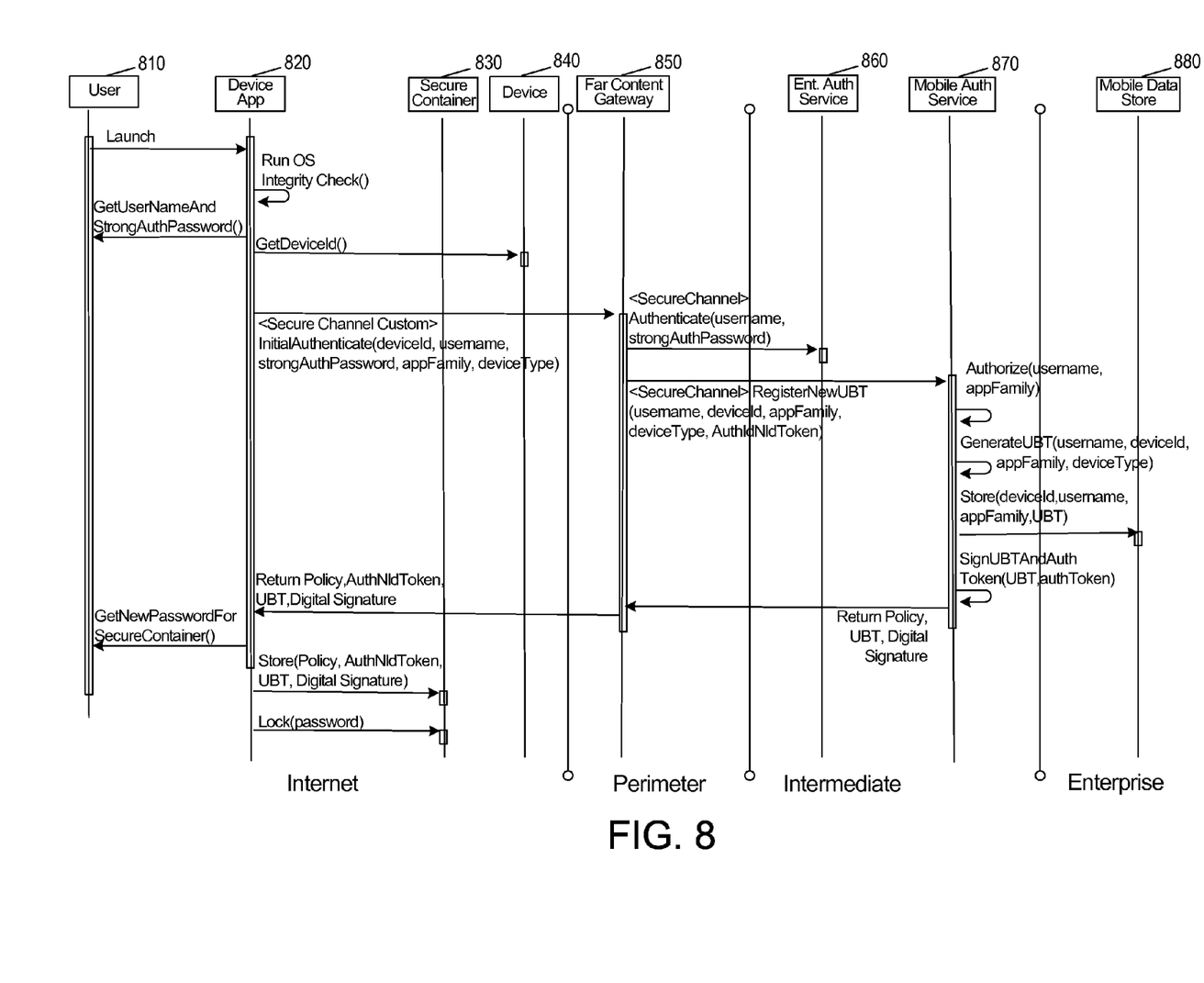
FIG. 8 is a sequence diagram illustrating an initial authentication flow between a device application and an enterprise in accordance with one or more embodiments of the present invention.

FIG. 8 is a sequence diagram illustrating an initial authentication flow between a device application and an enterprise in accordance with one or more embodiments of the present invention. As illustrated in FIG. 8, user 810 launches device application 820. An integrity detection process is used to determine if the expected OS integrity is present. For example, the integrity detection process can determine if device 840 operating in an elevated unauthorized privilege (e.g., rooting or jailbreak) mode. Device application 820 requests a node identifier (e.g., a Kerberos™ ID) and an authentication password. At which point the device identifier is obtained from device 840. An initial authentication request can then be submitted (e.g., using a secure connection) to far content gateway 850. The initial authentication request can include the authentication password, the device identifier, application family, the device type, and/or other information. Far content gateway 850 can then send an authentication request to authentication service 860. Once authentication service 860 authenticates user 810, a UBT is registered by mobile authorization service 870.

Mobile authorization service 870 can authorize access, generate a UBT, and store the device identifier, the user name, application family, and the UBT. Mobile authorization service 870 signs the UBT and authentication token before returning a policy, a UBT, and a digital signature to far content gateway 850. Far content gateway 850 then generates a FAT which is returned along with the policy, UBT and digital signature to device application 820. In some cases, the policy may require device application 820 to request a new password for secure container 830. The FAT, UBT, and digital signature can then be stored in secure container 830 which can be locked with the password.

Figure 9:
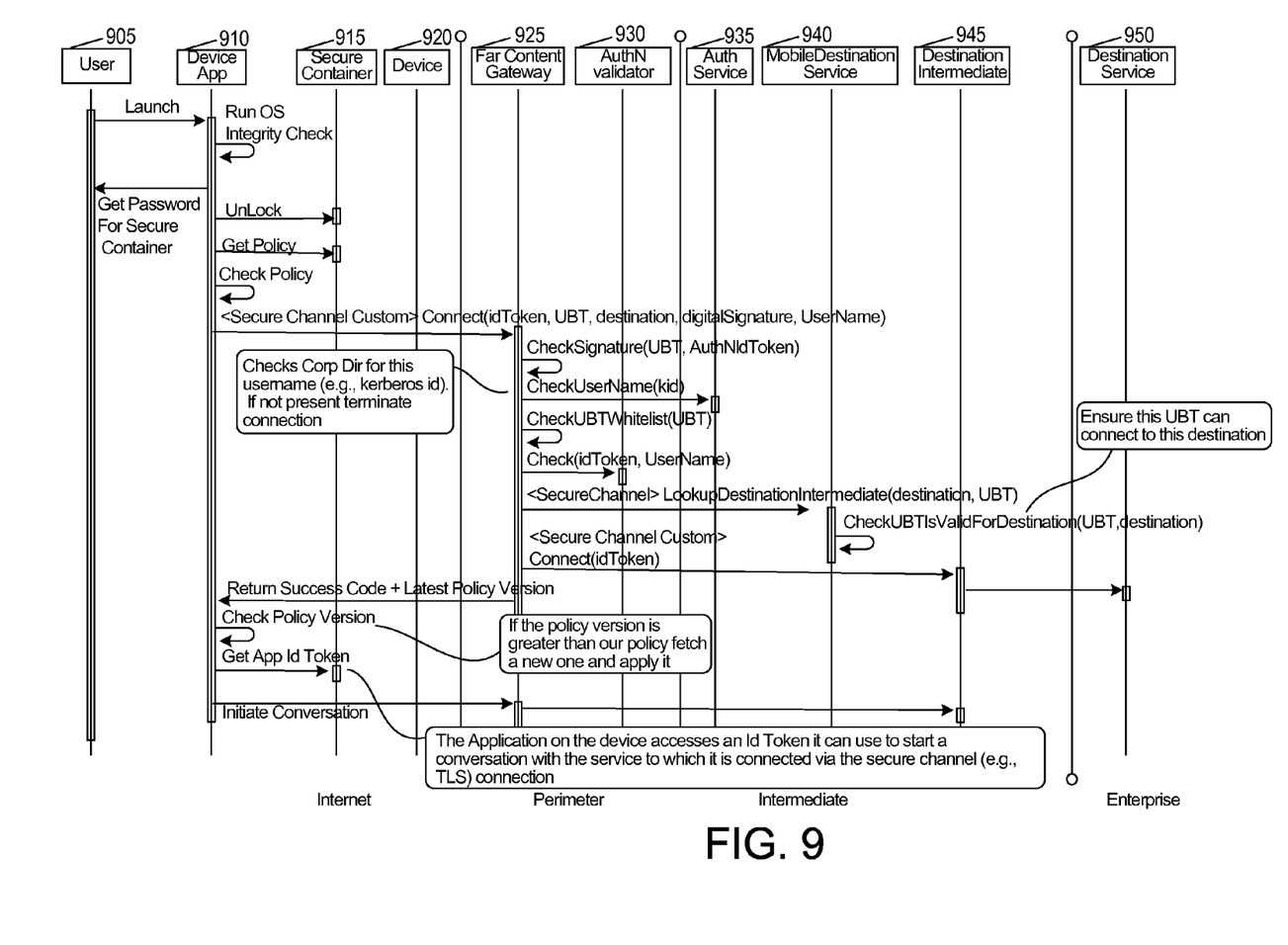
FIG. 9 is a sequence diagram illustrating a continuous authentication flow between a device application and an enterprise in accordance with various embodiments of the present invention.

FIG. 9 is a sequence diagram illustrating a continuous authentication flow between a device application and an enterprise in accordance with various embodiments of the present invention. In the embodiments illustrated in FIG. 9, user 905 launches device application 910. An operating system integrity check (e.g., a jail break detection process) can then be used to determine if the integrity of the operating system on device 920 has been compromised. If the operating system integrity check determines that the operating system is not as expected, then device application 910 will not be allowed to connect with gateway 925. If integrity of the operating system is as expected, device application 910 retrieves the secure container password from user 905 and unlocks secure container 915 to retrieve the current policy. Device application 910 checks the enforcement of the policy and connects to far content gateway 925. Far content gateway 925 checks the digital signature of the UBT and authentication token. Far content gateway 925 can also submit a user name to authentication service 935, check a directory to determine the status of the username and if the UBT is on a whitelist, and submit the user name and token to authentication validator 930.

Device application 910 submits the canonical name of the enterprise service 950 to which the device application wants to connect. Far content gateway 925 uses destination service 940 to determine if the UBT is allowed to connect to that service. If the UBT is allowed to connect, far content gateway 925 binds a connection to the enterprise service 950, or proxy or intermediate destination 945 to that service 950. A success code is returned from far content gateway 925 to device application 910 along with the latest policy version. Device application 910 checks to see if the policy version just returned is greater than the policy retrieved form the secure container 915. If the policy version is greater, then the new policy is applied. The FAT can then be retrieved form secure container 915 and the conversation with far content gateway 925 can be initiated.

Exemplary Computer System Overview

Figure 10:
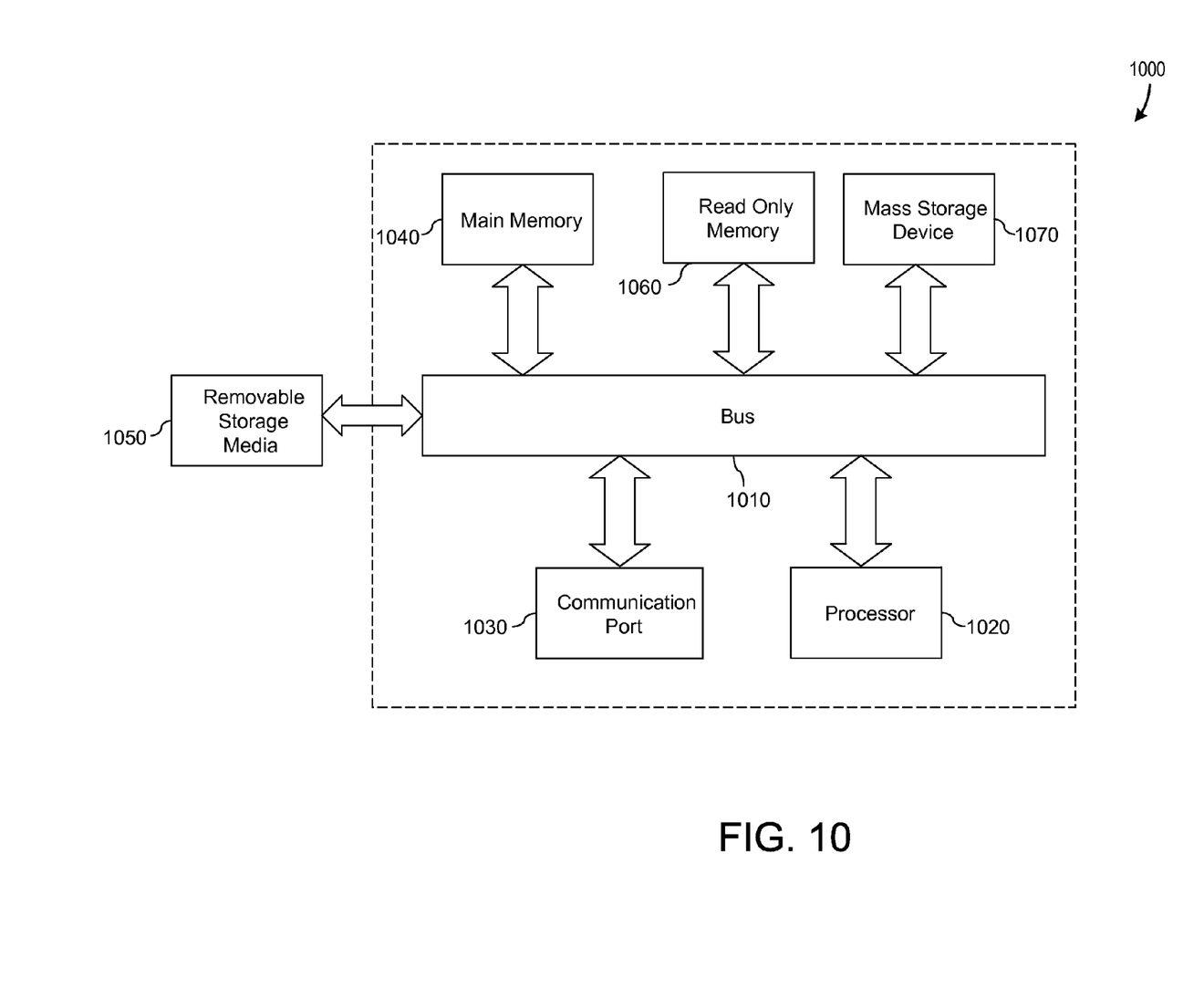
FIG. 10 illustrates an example of a computer system with which some embodiments of the present invention may be utilized.

Embodiments of the present invention include various steps and operations, which have been described above. A variety of these steps and operations may be performed by hardware components which are part of a mobile device, server, or other computer system used within embodiments of the present invention. In some embodiments, these steps and operations may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 10 illustrates some components which may be used as part of a computer system 1000 with which embodiments of the present invention may be utilized. As illustrated in FIG. 10, the computer system may include a bus 1010, at least one processor 1020, at least one communication port 1030, a main memory 1040, a removable storage media 1050, a read only memory 1060, and a mass storage 1070. In some cases, computer system 1000 may not include any local storage such as removable storage media 1050, mass storage 1070, and the like.

Processor(s) 1020 can be any known processor, such as, but not limited to, an Intel® Itanium® or Itanium 2® processor(s); AMD® Opteron® or Athlon MP® processor(s); ARM-based processors; or Motorola® lines of processors. Communication port(s) 1030 can be any of an RS-232 port for use with a modem-based dialup connection, a 10/100 Ethernet port, or a Gigabit port using copper or fiber. Communication port(s) 1030 may be chosen depending on a network such as a Local Area Network (LAN), Wide Area Network (WAN), or any network to which the computer system 1000 connects.

Main memory 1040 can be Random Access Memory (RAM) or any other dynamic storage device(s) commonly known in the art. Read only memory 1060 can be any static storage device(s) such as Programmable Read Only Memory (PROM) chips for storing static information such as instructions for processor 1020.

Mass storage 1070 can be used to store information and instructions. For example, hard disks such as the Adaptec® family of SCSI drives, an optical disc, an array of disks such as RAID, such as the Adaptec family of RAID drives, or any other mass storage devices may be used.

Bus 1010 communicatively couples processor(s) 1020 with the other memory, storage and communication blocks. Bus 1010 can be a PCI/PCI-X or SCSI based system bus depending on the storage devices used.

Removable storage media 1050 can be any kind of external hard-drives, floppy drives, IOMEGA® Zip Drives, Compact Disc—Read Only Memory (CD-ROM), Compact Disc—Re-Writable (CD-RW), and/or Digital Video Disk—Read Only Memory (DVD-ROM).

The components described above are meant to exemplify some types of possibilities. In no way should the aforementioned examples limit the scope of the invention, as they are only exemplary embodiments. Moreover, some of the computer systems (e.g., servers, clients, mobile devices, etc.) contemplated by embodiments of the present invention may not include all of these components. In addition, some of the computer systems may include different configurations and/or additional components from those illustrated in FIG. 10. For example, some computer systems (e.g., mobile devices) may include a GPS unit and various types of I/O devices (e.g., touchscreens, eye tracking modules, natural language processors, LCD, keyboards, etc.).

In conclusion, the present invention provides novel systems, methods and arrangements for a secure mobile framework for enterprise managed applications. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features.

What is claimed is:

1. A system comprising:
   a gateway server, providing remote devices with access to services of an enterprise, wherein each remote device has stored in memory one or more applications managed by the enterprise;
   an authenticator, accessible by the gateway server, and including a processor configured to:
     determine if a user of one of the remote devices is authorized to access the enterprise; and
     construct policies regarding the management of the one or more applications, wherein the policies are based on the services that the user of the one of the remote devices is authorized to access on the one of the remote devices;
   a token generator accessible by the gateway and including a processor configured to: generate one or more tokens for creating secure connections between the one or more applications managed by the enterprise and the services, wherein the one or more tokens includes a user binding token comprising an amalgamated, unique representation of a user identifier of the user, a device identifier of the remote device of the user, an application family associated with the one or more applications, and a device type associated with the device identifier; and
   a communications module including a processor configured to communicate the policies to the remote devices.

2. The system of claim 1, further comprising a discovery service to determine which of the services of the enterprise to connect with the one or more applications.

3. The system of claim 2, wherein the discovery service selects which of the services to connect with the one or more applications based on the user and a set of associated privileges.

4. The system of claim 1, wherein the token generator generates an enterprise authentication token and a framework authentication token.

5. The system of claim 4, wherein framework authentication token includes the enterprise authentication token, the user binding token, and a framework authentication token expiration date.

6. The system of claim 4, wherein the user binding token is generated based on a user identifier, a device identifier, device type identifier, and an application family identifier.

7. The system of claim 1, further comprising an anomaly detector to monitor activity between the remote devices and the services and generate an anomaly indicator, and wherein the anomaly detector further determines a reaction to the anomaly indicator.

8. The system of claim 1, wherein the gateway server includes multiple levels each of which provides isolated authentication protocols and activity logging.

9. The system of claim 8, wherein the multiple levels include a perimeter gateway and an intermediate gateway.

10. The system of claim 9, wherein the intermediate gateway uses mobile device telemetry and configuration settings to generate indicators of fraud or anomaly detection.

11. The system of claim 1, wherein the policies constructed regarding the management of the one or more applications include a unique policy for each of the one or more applications.

12. The system of claim 1, wherein the policies constructed regarding the management of the one or more applications include a common policy for a subset of the one or more applications that share access to authorization and authentication information.

* * * * *